May 3, 1966   J. F. REUTHER   3,249,848
GENERATOR REGULATOR CIRCUITRY
Filed April 10, 1963   3 Sheets-Sheet 1

WITNESSES:
John L. Clopp

INVENTOR
John F. Reuther
BY C. L. Freedman
ATTORNEY

May 3, 1966          J. F. REUTHER          3,249,848
GENERATOR REGULATOR CIRCUITRY

Filed April 10, 1963          3 Sheets-Sheet 3

United States Patent Office 3,249,848
Patented May 3, 1966

3,249,848
GENERATOR REGULATOR CIRCUITRY
John F. Reuther, Penn Hills Township, Allegheny County, Pa., assignor to Westinghouse Electric Corporation, East Pittsburgh, Pa., a corporation of Pennsylvania
Filed Apr. 10, 1963, Ser. No. 272,089
7 Claims. (Cl. 322—99)

This invention relates to circuits for sensing a condition wherein an electrical generator is operating outside of its designated capability region, and more particularly to circuits of the type described for use with hydrogen-cooled alternating current generators.

As is known, most large synchronous generators for use in power applications are cooled by means of hydrogen or other gas under pressure which flows through passageways in the generator coils and other parts of the equipment. Such a generator must be operated within a certain capability region as determined by the output power and power factor to prevent excessive overheating and resultant damage. The capability is a function of the cooling gas pressure and can be described on a capability curve as families of arcs of circles, with each arc defining the capability for a particular gas pressure. As will be seen, one family of arcs exists for the region where the generator is operating at or above its rated power factor at constant armature current; another family exists for the over-excited region of operation; and still another family exists for the under-excited region.

In the past, generators of this type employed standard relay protection with under-excitation limit for stability reasons; however it is now considered necessary to provide a regulating system which will maintain the generator closely within the guaranteed limits shown on its capability curve.

Accordingly, as an overall object, the present invention provides new and improved circuitry for regulating a generator so as to maintain it within its rated capability regardless of the region in which the generator is operating.

Another object of the invention is to provide a regulating system of the type described adapted for use with gas-cooled generators.

In accordance with the invention, I provide means for generating a first voltage which varies as a function of the pressure of the cooling fluid for the generator and which is proportional to the radius of the arc on the capability curve defining that specific pressure, means for generating a second voltage which varies as a function of the power factor and power delivered by the generator as well as the distance of the center of the arc for the aforesaid specific pressure from the center of the capability curve, and means for comparing said voltages to produce an output indicating signal when the second voltage exceeds the first voltage in magnitude, this condition occurring when the generator has exceeded its capability.

The above and other objects and features of the invention will become apparent from the following detailed description taken in connection with the accompanying drawings which form a part of this specification, and in which.

Figure 1:
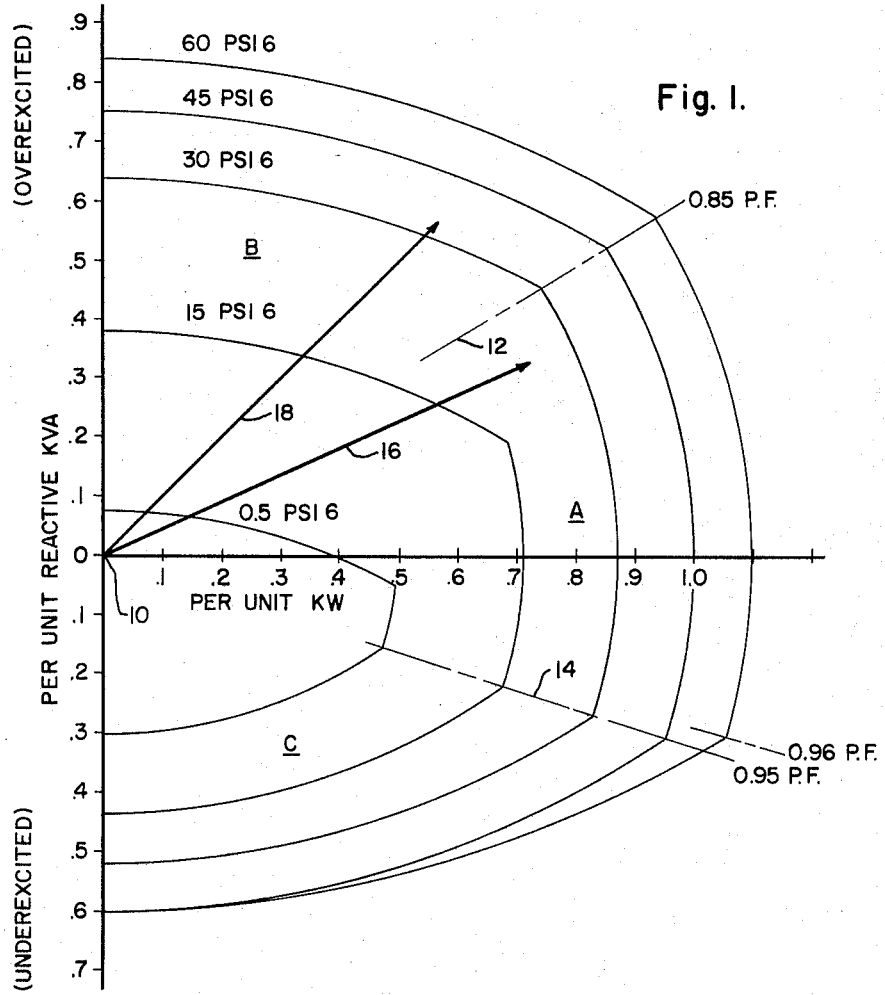
FIGURE 1 is an illustration of a capability curve for one type of hydrogen-cooled generator.

Referring now to the drawings, and particularly to FIG. 1, the capability curve for a specific hydrogen inner-cooled turbine generator is shown. The generator in this specific instance is rated at 45 pounds per square inch gauge (p.s.i.g.) hydrogen pressure; has a rated power factor of 0.85; and a short-circuit ratio of 0.64. It should be understood, however, that the curve of FIG. 1 is for one specific generator which is used for purposes of illustration only and that the invention is usable in other and different types of generators.

In constructing the curve of FIG. 1, constant terminal voltage is assumed, and per unit true power on the "X" axis is plotted against per unit reactive power on the "Y" axis. It will be noted that the curve consists of three families of arcs designated generally as A, B and C. The first family of arcs A have their center point 10 at the center of the graph and, except for the lower hydrogen pressures, extend between lines 12 and 14 which define the rated power factors of the generator in the over-excited and under-excited regions, respectively. In the region A, constant armature current is employed, while field current is varied. In region B, rated field current is employed while in region C end iron heating in the core is the determining factor. If it is assumed that the kva. (kilovolt ampere) output of the generator is 0.8 of its rated kva. and that the power factor is about 0.90, the kva. output of the machine will appear as the vector 16, and the point of termination of the vector determines the gas pressure. In the particular case illustrated, the machine is operating in the region A within its rated power factor; and the graph shows that the pressure of the cooling fluid for the generator should not fall below about 25 p.s.i.g. If the kva. output of the machine is again 0.8 of its rated output, but the power factor has decreased to about 0.70, the kva. output will be indicated by the vector 18. It will be noted that the generator is now operating in the over-excited region B. Furthermore, the pressure of the cooling fluid will now have to be increased from about 25 p.s.i.g. for the case where the power factor is 0.90 to almost 35 p.s.i.g.

The families of arcs in the capability curve of FIG. 1 are determined empirically. As was mentioned above, the centers of all of the arcs in region A are at point 10 which is the center of the capability curve. The centers of the arcs in the over-excited and under-excited regions B and C, respectively, are all on the "Y" axis; however the distances of the centers of the arcs in regions B and C from point 10 vary.

Figures 2, 3, 4:
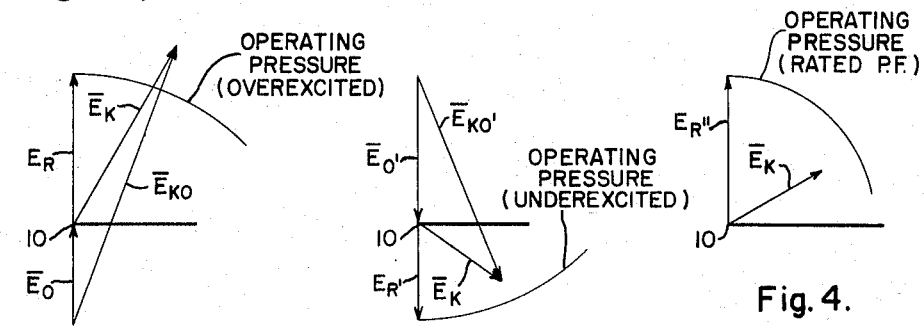
FIG. 2 is a vector diagram illustrating the manner of operation of the present invention in the over-excited region of operation of a generator.
FIG. 3 is a vector diagram illustrating the manner of operation of the present invention in the under-excited region of operation of a generator.
FIG. 4 is a vector diagram illustrating the manner of operation of the present invention at or above the rated power factor for a generator.

In accordance with the present invention, means are provided for producing a voltage which is proportional to the radius of an arc shown in FIG. 1, and this voltage is compared with another voltage dependent upon the power factor and power delivered by the machine as well as the distance of the center of the arc from the center 10 of the graph for the specific fluid pressure employed, assuming that the machine is operating in the under-excited or over-excited region. If the one voltage exceeds the other, it is then known that the machine is operating out of its capability region. This is known vectorially for the over-excited region in FIG. 2. A voltage $\overline{E}_O$ proportional to the displacement of the center of the capability arc for a particular fluid pressure from the origin 10 is vectorially added to a voltage $\overline{E}_K$ whose phase and magnitude correspond to the power factor and magnitude of the kva. which the machine is delivering. The magnitude of this vector sum, $\overline{E}_{KO}$, may then be compared with the magnitude of $E_R$, a voltage whose magnitude is proportional to the radius of the desired arc. If the voltage $\overline{E}_{KO}$ exceeds the voltage $E_R$, the machine is out of limits. Therefore, by comparing these two voltages such that an output signal is produced when $\overline{E}_{KO}$ exceeds $E_R$, the machine can be maintained within its capability limit for a particular fluid pressure. As will be understood, an example for only one gas pressure is shown in FIG. 2. If the gas pressure increases, the voltage $E_R$ will also increase, and the voltage $\overline{E}_O$ may increase or decrease, depending upon the displacement of the center of the arc for that pressure from the origin 10. The phase relationship between voltages $\overline{E}_K$ and $\overline{E}_O$ must be such that at unity power factor $\overline{E}_K$ and $\overline{E}_O$ are displaced by 90°. This relationship must exist since the centers of all arcs fall on the "Y" axis.

The example given above in FIG. 2 is for the overexcited region of operation as was mentioned above. The under-excited region of operation is shown in FIG. 3, and it will be noted that a voltage $\overline{E}_{O'}$ proportional to the displacement of the center of the capability arc in the under-excited region from the origin is vectorially added to the voltage $\overline{E}_K$ which, as mentioned above, varies in phase and magnitude corresponding to the power factor and magnitude of the kva. the machine is delivering. The vector sum of these two voltages $\overline{E}_{KO'}$ is then compared with the magnitude of the voltage $E_{R'}$ which is proportional to the radius of a particular capability arc in the under-excited region as determined by the fluid pressure employed in the machine. If $\overline{E}_{KO'}$ exceeds $E_{R'}$, the machine is operating out of limits.

The situation for the case where the machine is operating within its rated power factor (i.e., region A in FIG. 1) is shown in FIG. 4. In this case, the centers of all of the arcs are at the origin 10 so that the voltage $\overline{E}_K$ or $\overline{E}_{O'}$ of FIGS. 2 and 3 becomes unnecessary. That is, only the voltage $\overline{E}_K$ whose phase and magnitude correspond to the power factor and magnitude of the kva. the machine is delivering is compared with the voltage $E_{R''}$ which varies in magnitude with the fluid pressure employed in the machine. If $\overline{E}_K$ exceeds $E_{R''}$, the machine is then out of limits for the region within the rated power factor.

Figure 5:
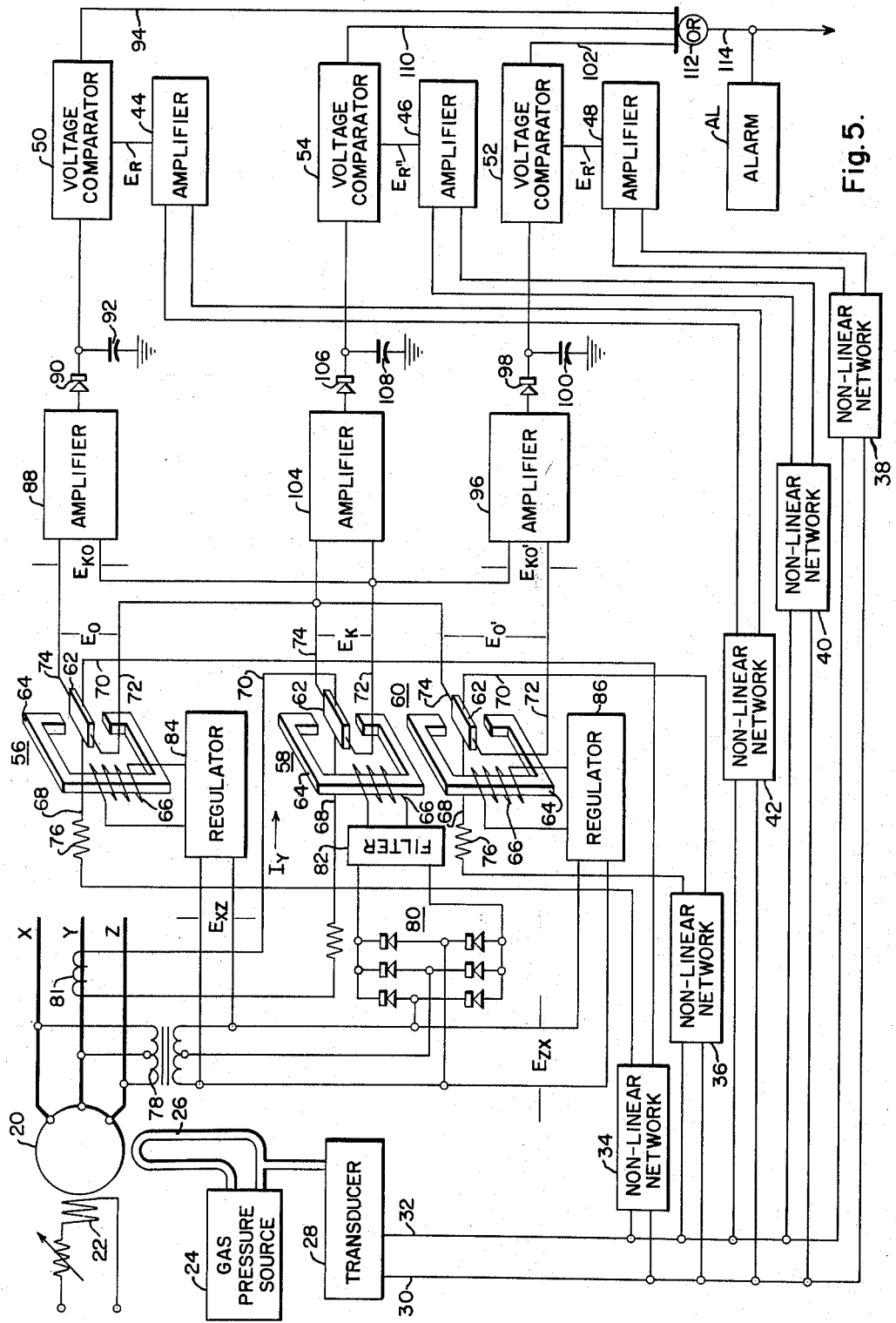
FIG. 5 is a schematic circuit diagram of the regulating system of the invention.

Circuitry for generating the voltages shown in FIGS. 2, 3 and 4 and for comparing certain of those voltages to produce an output signal when the machine is operating out of limits is shown in FIG. 5. The generator itself is schematically illustrated at 20 and is provided with the usual field circuit 22. The generator delivers three-phase current, the three phases being identified as X, Y and Z. Cooling fluid, such as hydrogen, is supplied from a gas pressure source 24 to the cooling passageways in the generator 20, schematically illustrated at 26. Connected to the gas pressure source 24 is a transducer 28 which produces an output signal on leads 30 and 32 proportional to the actual fluid pressure in the cooling passageways 26.

The voltage on leads 30 and 32 is applied to five non-linear networks identified by the numerals 34, 36, 38, 40 and 42, respectively. The voltage output of the non-linear network 42 is amplified in amplifier 44 and comprises the direct current voltage $E_R$, which voltage is shown in FIG. 2. As will be understood, this voltage will vary with gas pressure in accordance with the capability curve of FIG. 1. The necessity for a non-linear network to convert the output of the transducer 28 into the voltage $E_R$ will be apparent from observation of the curves of FIG. 1 wherein it can be seen, for example, that the spacing between the curves for 15 p.s.i.g. and 30 p.s.i.g. is much greater than that between 45 p.s.i.g. and 60 p.s.i.g. In other words, the non-linear network 42 is necessary since the radii of the arcs of FIG. 1 do not vary linearly with gas pressure.

Figure 6:
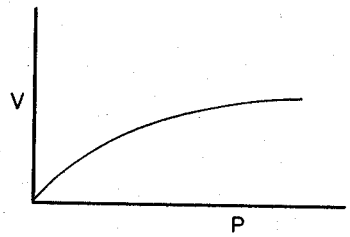
FIG. 6 is a graphical representation of certain voltage and pressure relations useful in explaining the invention.
Figure 7:
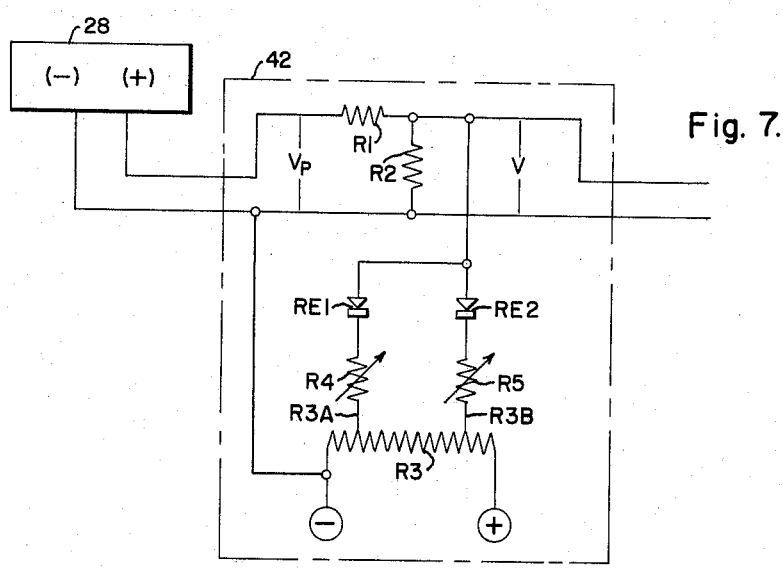
FIG. 7 is a schematic circuit diagram of a non-linear circuit which is suitable for the circuit diagram of FIG. 5.

A suitable relation between gas pressure P and output voltage V of the network 42 is shown in FIG. 6 wherein ordinates represent values of the pressure P and abscissas represent values of the voltage V. Any network capable of establishing a suitable non-linear relationship may be employed. In FIG. 7 the output voltage $V_P$ of the transducer 28 is applied through a resistor R1 across a resistor R2. The polarity of the output voltage $V_P$ is shown by conventional positive (+) and negative (−) polarity markings.

A voltage divider comprises a resistor R3 connected across a direct voltage source represented by positive (+) and negative (−) polarity markings. The negative terminal of the resistor R3 is connected to the negative output terminal of the transducer 28.

The output voltage $V_P$ is connected across portions of the resistor R3 determined by one or more adjustable taps. Two taps R3A and R3B are shown but the number is determined by the number of non-linear curve-shaping points desired. The tap R3A is connected through an adjustable resistor R4, a rectifier RE1 and the resistor R1 to the positive output terminal of the transducer 28. The tap R3B similarly is connected through an adjustable resistor R5, a rectifier RE2 and the resistor R1.

As the voltage $V_P$ increases from zero a point is reached at which the voltage V exceeds the voltage between the tap R3A and negative terminal of the resistor R3. The rectifier RE1 now permits current to flow which increases the voltage drop in the resistor R1 and thus decreases the rate of rise of the voltage V relative to the voltage $V_P$. As the voltage $V_P$ continues to increase a second point is reached at which current similarly flows through the rectifier RE2 to decrease further the rate of rise of the voltage V. The points of change of the rate of rise may be adjusted by adjustment of the taps. The slope of the curve relating the voltages V and $V_P$ may be adjusted by adjustment of the resistors R4 and R5.

In a somewhat similar manner, the output of non-linear network 40 is amplified in amplifier 46 to produce the voltage $E_{R''}$ of FIG. 4 which also varies non-linearly with pressure. Finally, the output of non-linear network 38 is amplified in amplifier 48 to produce the voltage $E_{R'}$ shown in FIG. 3 for the under-excited region, which voltage also varies non-linearly with pressure since the radii for the various arcs vary non-linearly.

From a consideration of the vector diagram of FIG. 2, it is apparent that the voltage $E_R$ at the output of amplifier 44 must be compared or subtracted from the voltage $\overline{E}_{KO}$ in a voltage comparator 50 in order to produce an output signal when the machine is operating outside of its limits. Similarly, from a consideration of FIG. 3, it is apparent that the voltage $E_{R'}$ must be subtracted or compared with the voltage $\overline{E}_{KO'}$ in voltage comparator 52; and the voltage $E_{R''}$ must be compared with the voltage $\overline{E}_K$ in voltage comparator 54.

In order to generate the voltages $\overline{E}_K$, $\overline{E}_{KO}$ and $\overline{E}_{KO'}$, circuitry including three Hall generators 56, 58 and 60 is employed. Each of the Hall generators 56–60 includes a Hall plate 62 disposed in a narrow air gap of a laminated magnetically permeable core 64. A magnetic field is induced in the core 64 and across the air gap by means of current flowing through a winding 66 wound about the core 64. Input current is applied to the Hall plate through leads 68 and 70; while a Hall voltage appears across leads 72 and 74 at right angles to the leads 68 and 70. In the operation of a Hall generator, a potential will appear across the output leads 72 and 74 proportional to the instantaneous product of the current through resistor 76 and the flux across the air gap of core 64.

The terminal voltage at the output of generator 20 is applied through transformer 78 to a three-phase rectifier 80, the output of the rectifier being passed through filter 82 to the winding 66 on Hall generator 58. Input leads 68 and 70 on the plate 62 for generator 58 are connected through current transformer 81 to phase Y at the output of generator 20. Thus, the voltage appearing across leads 72 and 74 is the voltage $\overline{E}_K$ mentioned above which comprises the instantaneous product of the current $I_Y$ in phase Y and the rectified terminal voltage applied to winding 66 of generator 58. In this manner, the voltage $\overline{E}_K$ at the output of Hall generator 58 is proportional to the product of the voltage and current (i.e., kva.) at the output of the generator 20.

With reference, now, to the Hall generator 56, a voltage $\overline{E}_{XZ}$ between the phases X and Z is applied through regulator 84 to the winding 66 on the Hall generator 56, the regulator 84 serving to maintain the voltage across the winding 66 substantially constant. Applied across resistor 76 is a direct current voltage from non-linear network 34 which is proportional to the distance of the arc in the over-excited region B of FIG. 1 from the origin 10 for the particular gas pressure employed. The output of the Hall generator 56 across leads 74 and 72 is, therefore, the voltage $\overline{E}_O$ shown in FIG. 2. The voltages $\overline{E}_O$ and $\overline{E}_K$ are, of course, alternating current voltages and the phase relationship of these voltages is such that at unity power factor at the output of generator 20, the voltage $\overline{E}_O$ will be 90° out of phase with respect to the voltage $\overline{E}_K$. This relationship is obtained by virtue of the fact that the alternating current voltage $\overline{E}_{XZ}$ applied to the Hall generator 56 is between two of the phases X and Z; while the current $\overline{I}_Y$ applied to the Hall generator 58 and which controls the phase of the voltage $\overline{E}_K$ is derived from the third phase Y. Since the voltage $\overline{E}_{XZ}$ will be 90° out of phase with respect to the current in phase Y at unity power factor, the correct relationship between the voltages $\overline{E}_O$ and $\overline{E}_K$ as outlined above is obtained.

Finally, with reference to Hall generator 60, the voltage $\overline{E}_{ZX}$, which is the same as voltage $\overline{E}_{XZ}$ except reversed in phase, is applied through regulator 86 to winding 66 on Hall generator 60, thereby producing the voltage $\overline{E}_{O'}$ which is reversed in phase with respect to the voltage $\overline{E}_O$ and 90° out of phase with the voltage $\overline{E}_K$ at unity power factor.

The voltage $\overline{E}_K$ is combined with the voltage $\overline{E}_O$ as shown to produce the voltage $\overline{E}_{KO}$. This voltage is amplified in amplifier 88; rectified and filtered by diode 90 and capacitor 92, and applied to the voltage comparator 50 where it is compared with or subtracted from the voltage $\overline{E}_R$. With reference again to FIG. 2, it can be seen that subtracting the voltage $\overline{E}_{KO}$ from the voltage $\overline{E}_R$ will produce an output signal on lead 94 indicating that the generator is operating out of its limit in the over-excited region.

Figure 8:
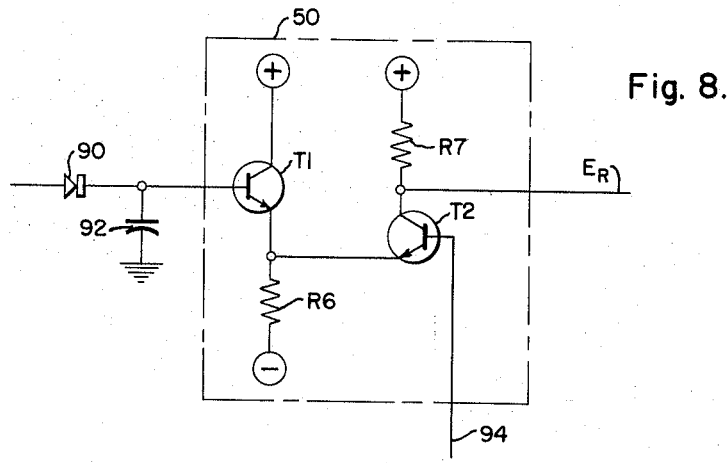
FIG. 8 is a schematic circuit diagram of a voltage comparator which is suitable for the circuit diagram of FIG. 5.

A comparator based on a known differential amplifier circuit is shown in FIG. 8 wherein two NPN transistors T1 and T2 have their emitters connected through a common resistor R6 to a terminal which is maintained at a substantial negative potential such as −125 volts relative to ground. The voltage across the capacitor 92 and the voltage $E_R$ are applied respectively between the bases of the transistors T1 and T2 and ground. The collector of the transistor T1 is maintained at a positive potential such as 12 volts relative to ground whereas the collector of the transistor T2 is connected through a resistor R7 to a terminal which is maintained at a positive potential of the order of 125 volts relative to ground.

According to my present understanding of the theory, in this type of differential amplifier the resistor is considered as a source of constant current to the two emitters. The input voltage to the transistor T1 in effect controls the portion of the current flowing in each of the collectors. When this input voltage exceeds a value determined by the input voltage $E_R$ to the transistor T2 an output signal is supplied to the lead 94 for indicating that the generator is out of limits.

In a similar manner, the voltage $\overline{E}_K$ is vectorially added to the voltage $\overline{E}_{O'}$ to produce the voltage $\overline{E}_{KO'}$. This voltage is amplified in amplifier 96; rectified and filtered by diode 98 and capacitor 100, and compared with voltage $E_{R'}$ in comparator 52 in accordance with the vector diagram of FIG. 3. Thus, if the generator is operating out of its limit in the under-excited region, a signal will be produced on lead 102.

Finally, voltage $\overline{E}_K$ is amplified in amplifier 104; rectified and filtered by diode 106 and capacitor 108, and compared in the voltage comparator 54 with the voltage $E_{R''}$ in accordance with the vector diagram of FIG. 4. If the voltage $\overline{E}_K$, after rectification, is larger in magnitude than the voltage $E_{R''}$, then an output signal will appear on lead 110 indicating that the generator is operating out of limits within region A of FIG. 1.

The signals on leads 94, 102 and 1109 are applied to an OR circuit 112 such that when a signal appears on any of these input leads, an output signal will appear on lead 114 to indicate that the generator is out of limits, regardless of whether it be in the over-excited, under-excited or rated power factor region. The signal on lead 114 may then be used to actuate an alarm AL or in circuitry for automatically bringing the generator back within limits.

Although the invention has been shown in connection with a certain specific embodiment, it will be readily apparent to those skilled in the art that various changes in form and arrangement of parts may be made to suit requirements without departing from the spirit and scope of the invention.

I claim as my invention:

1. In an electrical generator of the type which is cooled by fluid under pressure which flows through passageways in the generator and wherein the permissible power factor and power delivered at the output of the generator vary as a function of the pressure of said fluid; the combination of means for producing an indicating signal when the generator is operating outside of its capability region as determined by the pressure of said fluid, comprising means for generating a first voltage which varies as a function of the pressure of said cooling fluid, means for generating a second voltage which varies as a function of both the power factor and kva. delivered by the generator, and means for comparing said voltages to produce said output indicating signal when the second voltage exceeds the first voltage in magnitude.

2. In an electrical generator of the type which is cooled by fluid under pressure which flows through passageways in the generator and wherein the permissible power factor and power delivered at the output of the generator vary as a function of the pressure of said fluid; the combination of means for producing an indicating signal when the generator is operating outside of its permissible capability region as determined by the pressure of said fluid, comprising means for generating a first voltage which varies as a function of the pressure of said cooling fluid, means for generating a second voltage which is smaller in magnitude than said first voltage regardless of the pressure of said fluid, means for generating a third voltage whose phase and magnitude correspond to the power factor and kva. delivered by the generator, means for adding said second and third voltages to produce a fourth voltage, and means for electrically subtracting said first and fourth voltages to produce said output indicating signal when the fourth voltage exceeds the first voltage in magnitude.

3. In an electrical generator of the type which is cooled by fluid under pressure which flows through passageways in the generator and wherein the permissible power factor and power delivered at the output of the generator vary as a function of the pressure of said fluid; the combination of means for producing an indicating signal when the generator is operating outside of its capability region as determined by the pressure of said fluid, comprising means for generating a first direct current voltage which varies as a function of the pressure of said cooling fluid, means for generating a second alternating current voltage which is vectorially smaller in magnitude than said first voltage regardless of the pressure of said fluid, means for generating a third alternating current voltage whose phase and magnitude correspond to the power factor and kva. delivered by the generator, said second voltage being 90° out of phase with respect to said third voltage at unity power factor, means for vectorially adding said second and third voltages to produce a fourth alternating current voltage, means for rectifying said fourth alternating current voltage, and means for electrically subtracting said first and fourth rectified voltages to produce said output indicating signal when the fourth rectified voltage exceeds the first direct current voltage in magnitude.

4. In an electrical generator of the type which is cooled by fluid under pressure which flows through passageways in the generator and wherein the permissible power factor and power delivered at the output of the generator vary as a function of the pressure of said fluid; the combination of means for producing an indicating signal when the generator is operating outside of its capability region as determined by the pressure of said fluid, comprising transducer means responsive to the pressure of said fluid for generating a first direct current voltage which varies as a function of the pressure of said fluid, means including a Hall generator for generating a second alternating current voltage which is smaller in magnitude than said first voltage regardless of the pressure of said fluid, means including a Hall generator for generating a third alternating current voltage whose phase and magnitude correspond to the power factor and kva. delivered by the generator, said second voltage being 90° out of phase with respect to said third voltage at unity power factor, means for vectorially adding said second and third voltages to produce a fourth voltage, means for rectifying said fourth voltage, and means for electrically subtracting said first direct current voltage and fourth rectified voltage to produce said output indicating signal when the fourth rectified voltage exceeds the first direct current voltage in magnitude.

5. In an electrical generator of the type which is cooled by fluid under pressure which flows through passageways in the generator and wherein the permissible power factor and power delivered at the output of the generator vary as a function of the pressure of said fluid; the combination of means for producing an indicating signal when the generator is operating outside of its capability region as determined by the pressure of said fluid, comprising transducer means responsive to the pressure of said fluid for generating direct current voltages which vary as a function of the pressure of said cooling fluid, a first Hall generator responsive to the output voltage of said generator and one of said direct current voltages generated by the transducer for producing a first alternating current voltage, means including a second Hall generator responsive to the rectified output voltage of said generator and the output current of the generator for producing a second alternating current voltage whose phase and magnitude correspond to the power factor and kva. delivered by the generator, said first alternating current voltage being 90° out of phase with respect to said third voltage at unity power factor, means for vectorially adding said first and second alternating current voltages to produce a third alternating current voltage, means for rectifying said third alternating current voltage, and means for electrically comparing the other of said direct current voltages produced by said transducer means and said rectified third alternating current voltage to produce said output indicating signal when the rectified third alternating current voltage exceeds said other direct current voltage in magnitude.

6. In an electrical generator of the type which is cooled by fluid under pressure which flows through passageways in the generator and wherein the permissible power factor and power delivered at the output of the generator vary as a function of the pressure of said fluid; the combination of means for producing an indicating signal when the generator is operating outside of its capability region as determined by the pressure of said fluid, comprising means for generating a voltage $\overline{E}_K$ whose phase and magnitude correspond to the power factor and kva. delivered by the generator, means for generating a voltage $\overline{E}_O$ which is a function of fluid pressure in the over-excited region of the generator, means for generating a voltage $\overline{E}_{O'}$ which is a function of fluid pressure in the under-excited region of the generator, means for adding the voltages $\overline{E}_K$ and $\overline{E}_O$ to produce a voltage $\overline{E}_{KO}$, means for adding the voltages $\overline{E}_K$ and $\overline{E}_{O'}$ to derive a voltage $\overline{E}_{KO'}$, means for generating a voltage $E_R$ which varies as a function of fluid pressure in the over-excited region of the generator, means for generating a voltage $E_{R'}$ which varies as a function of fluid pressure in the under-excited region of the generator, means for generating a voltage $E_{R''}$ which varies as a function of fluid pressure in the operating region of the generator near unity power factor, means for rectifying the voltages $\overline{E}_{KO}$, $\overline{E}_K$ and $\overline{E}_{KO'}$, means for comparing the rectified voltages $\overline{E}_{KO}$, $\overline{E}_K$ and $\overline{E}_{KO'}$ with the voltages $E_R$, $E_{R''}$ and $E_{R'}$, respectively, and means for producing an indicating output signal whenever the rectified voltage $\overline{E}_{KO}$, $\overline{E}_K$ or $\overline{E}_{KO'}$ exceeds the voltage $E_R$, $E_{R''}$ or $E_{R'}$, respectively.

7. In an alternating current three-phase generator of the type which is cooled by fluid under pressure which flows through the passageways in the generator and wherein the permissible power factor and power delivered at the output of the generator vary as a function of the pressure of said fluid; the combination of means for producing an indicating signal when the generator is operating outside of its capability region as determined by the pressure of said fluid, comprising means responsive to the voltage across two of the phases of the generator and a voltage proportional to the pressure of said fluid for generating a first alternating current signal $\overline{E}_O$, means responsive to the current through the third phase at the output of said generator and to the rectified output voltage of the generator for producing a voltage $\overline{E}_K$ whose phase and magnitude correspond to the power factor and kva. delivered by the generator, the voltage $\overline{E}_O$ being 90° out of phase with respect to the voltage $\overline{E}_K$ at unity power factor, means for vectorially adding the voltages $\overline{E}_O$ and $\overline{E}_K$ to produce a voltage $\overline{E}_{KO}$, means for rectifying the voltage $\overline{E}_{KO}$, means for producing a direct current voltage $E_R$ which varies as a function of the pressure on said fluid, and means for comparing the rectified voltage $\overline{E}_{KO}$ with the voltage $E_R$ to produce said output indicating signal when the voltage $\overline{E}_{KO}$ exceeds the voltage $E_R$.

No references cited.

ORIS L. RADER, *Primary Examiner.*

J. J. SWARTZ, *Assistant Examiner.*